US011955697B2

(12) United States Patent
Lee et al.

(10) Patent No.: US 11,955,697 B2
(45) Date of Patent: Apr. 9, 2024

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Young Jun Lee, Seoul (KR); Han Sub Ryu, Gyeongsangbuk-do (KR); Gi Hwan Ahn, Chungcheongnam-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 280 days.

(21) Appl. No.: 17/500,275

(22) Filed: Oct. 13, 2021

(65) Prior Publication Data

US 2022/0037765 A1 Feb. 3, 2022

Related U.S. Application Data

(63) Continuation of application No. PCT/KR2020/005088, filed on Apr. 16, 2020.

(30) Foreign Application Priority Data

Apr. 19, 2019 (KR) ........................ 10-2019-0046071

(51) Int. Cl.
*H01Q 1/36* (2006.01)
*H01Q 1/24* (2006.01)
*H01Q 9/04* (2006.01)

(52) U.S. Cl.
CPC ............... *H01Q 1/243* (2013.01); *H01Q 1/24* (2013.01); *H01Q 1/36* (2013.01); *H01Q 9/04* (2013.01); *H01Q 9/0407* (2013.01)

(58) Field of Classification Search
CPC ........ H01Q 1/36; H01Q 9/0407; H01Q 1/243; H01Q 1/24; H01Q 9/04

(Continued)

(56) References Cited

U.S. PATENT DOCUMENTS

2015/0294781 A1 10/2015 Yosui et al.
2016/0188092 A1 6/2016 Sebastian et al.

(Continued)

FOREIGN PATENT DOCUMENTS

CN 101180765 A 5/2008
CN 106708309 A 5/2017

(Continued)

OTHER PUBLICATIONS

International Search Report for PCT/KR2020/005088 dated Aug. 7, 2020.

*Primary Examiner* — Hai V Tran
(74) *Attorney, Agent, or Firm* — The PL Law Group, PLLC

(57) ABSTRACT

An antenna device according to an embodiment of the present invention includes a dielectric layer, a radiator and a dummy electrode. The radiator is disposed on the upper surface of the dielectric layer. The radiator includes a first mesh structure, and the first mesh structure includes a first antenna electrode line and a second antenna electrode line which cross each other. The dummy electrode is spaced apart from the radiator by the separation region on the upper surface of the dielectric layer. The dummy electrode includes a second mesh structure, and the second mesh structure includes a first dummy electrode line and a second dummy electrode line which cross each other. A spacing distance between the first dummy electrode line and the radiator is different from a spacing distance between the second dummy electrode line and the radiator at the separation region.

13 Claims, 8 Drawing Sheets

(58) Field of Classification Search
USPC .................................................. 343/700 MS
See application file for complete search history.

(56) References Cited

U.S. PATENT DOCUMENTS

| | | | | |
|---|---|---|---|---|
| 2020/0251814 | A1* | 8/2020 | Ryu | H01Q 7/00 |
| 2020/0403301 | A1* | 12/2020 | Ryu | H01Q 1/364 |
| 2020/0411959 | A1* | 12/2020 | Ryu | H01Q 1/38 |

FOREIGN PATENT DOCUMENTS

| | | | |
|---|---|---|---|
| CN | 108536329 | A | 9/2018 |
| CN | 212412196 | U | 1/2021 |
| EP | 0 911 906 | A2 | 4/1999 |
| JP | 2012-094115 | A | 5/2012 |
| JP | 2017-175540 | A | 9/2017 |
| KR | 10-2013-0095451 | A | 8/2013 |
| KR | 10-1294636 | B1 | 8/2013 |
| KR | 10-2014-0038819 | A | 3/2014 |
| KR | 10-2015-0104509 | A | 9/2015 |
| KR | 10-1940798 | B1 | 1/2019 |
| KR | 10-1967771 | B1 | 4/2019 |

* cited by examiner

ANTENNA DEVICE AND DISPLAY DEVICE INCLUDING THE SAME

CROSS REFERENCE TO RELATED APPLICATIONS AND CLAIM OF PRIORITY

The present application is a continuation application to International Application No. PCT/KR2020/005088 with an International Filing Date of Apr. 16, 2020, which claims the benefit of Korean Patent Application No. 10-2019-0046071 filed on Apr. 19, 2019 at the Korean Intellectual Property Office, the disclosures of which are incorporated by reference herein in their entirety.

BACKGROUND

1. Field

The present invention relates to an antenna device and a display device including the same. More particularly, the present invention related to an antenna device including electrode lines and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high-frequency or ultra-high frequency communication is needed in the display device. Further, as thin-layered display devices with high transparency and resolution such as a transparent display device, a flexible display device, etc., have been developed recently, the antenna having improved transparency and providing high radiation property and signaling sensitivity is also required.

To improve signal transmission and reception properties of the antenna, electrode or radiation patterns may be preferably formed using a low resistance metal. In this case, the electrode or radiation patterns may be visually recognized by a user of the display device and an image quality may be degraded. When an electrode design is changed for reducing an electrode visibility, radiation reliability from the antenna may be deteriorated.

For example, Korean Patent Application Publication No. 2013-0095451 discloses an antenna integrated in a display, but fails to consider an image degradation by the antenna in a display device.

SUMMARY

According to an aspect of the present invention, there is provided an antenna device having improved optical property and radiation reliability.

According to an aspect of the present invention, there is provided a display device including an antenna device with improved optical property and radiation reliability and having improved image quality.

The above aspects of the present invention will be achieved by one or more of the following features or constructions:

(1) An antenna device, including: a dielectric layer including a separation region defined on an upper surface thereof;

a radiator on the upper surface of the dielectric layer, the radiator including a first mesh structure, wherein the first mesh structure includes a first antenna electrode line and a second antenna electrode line which cross each other; and a dummy electrode spaced apart from the radiator by the separation region on the upper surface of the dielectric layer, the dummy electrode including a second mesh structure, wherein the second mesh structure includes a first dummy electrode line and a second dummy electrode line which cross each other, wherein a spacing distance between the first dummy electrode line and the radiator is different from a spacing distance between the second dummy electrode line and the radiator at the separation region.

(2) The antenna device according to the above (1), wherein the first dummy electrode line and the first antenna electrode line extend in the same direction, and a first spacing distance is defined between the first dummy electrode line and the first antenna electrode line adjacent to each other at the separation region, wherein the second dummy electrode line and the second antenna electrode line extend in the same direction, and a second spacing distance is defined between the second dummy electrode line and the second antenna electrode line adjacent to each other at the separation region.

(3) The antenna device according to the above (2), wherein the first spacing distance is greater than the second spacing distance.

(4) The antenna device according to the above (3), wherein the first spacing distance is 1.5 to 5 times the second spacing distance.

(5) The antenna device according to the above (3), wherein the second spacing distance is 3 μm to 10 μm.

(6) The antenna device according to the above (2), wherein the first mesh structure includes a rhombus-shaped antenna unit cell, and the second mesh structure includes a rhombus-shaped dummy unit cell.

(7) The antenna device according to the above (6), wherein the first spacing distance is defined as a distance between the first dummy electrode line and a vertex portion of the antenna unit cell at the separation region, and the second spacing distance is defined as a distance between the second dummy electrode line and the vertex portion of the antenna unit cell at the separation region.

(8) The antenna device according to the above (7), wherein a vertex portion of the dummy unit cell positioned at the separation region has a cut shape.

(9) The antenna device according to the above (1), wherein an intersecting portion of the first antenna electrode line and the second antenna electrode line has a concave lateral surface.

(10) The antenna device according to the above (1), further including a ground layer on a lower surface of the dielectric layer.

(11) The antenna device according to the above (1), further including: a transmission line electrically connected to the radiator; and a signal pad electrically connected to an end of the transmission line.

(12) The antenna device according to the above (11), wherein the transmission line includes the first mesh structure.

(13) The antenna device according to the above (1), further including a ground pad on the upper surface of the dielectric layer around the signal pad to be separated from the signal pad.

(14) The antenna device according to the above (13), wherein signal pad or the ground pad has a solid structure.

(15) A display device including the antenna device according to embodiments above.

In an antenna device according to exemplary embodiments of the present invention, a dummy electrode may be formed around an antenna unit, and the antenna unit and the dummy electrode may be formed as a mesh structure. Thus, transmittance of the antenna device may be improved and an electrode recognition due to a pattern shape deviation may be prevented.

In exemplary embodiments, the antenna unit and the dummy electrode may be separated by different spacing distances at a separation region of the antenna unit and the dummy electrode. Accordingly, a pattern irregularity at the separation region may be increased, and the electrode recognition due to a regular repetition of contrast may be reduced or prevented.

The antenna device may have improved transmittance and may be applied to a display device including a mobile communication device capable of being operated in a high frequency or ultra-high frequency band to improve optical properties such as a transmittance and radiation properties.

DETAILED DESCRIPTION OF THE EMBODIMENTS

According to exemplary embodiments of the present invention, there is provided an antenna device including a radiator and a dummy electrode which may be formed as a mesh structure on a dielectric layer to be isolated from each other.

The antenna device may be, e.g., a microstrip patch antenna fabricated as a transparent film. The antenna device may be applied to a communication device for high frequency band or ultrahigh frequency band (e.g., 3G, 4G, 5G or more) mobile communications.

According to exemplary embodiments of the present invention, there is provided a display device including the antenna device. An application of the antenna device is not limited to the display device, and the antenna device may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
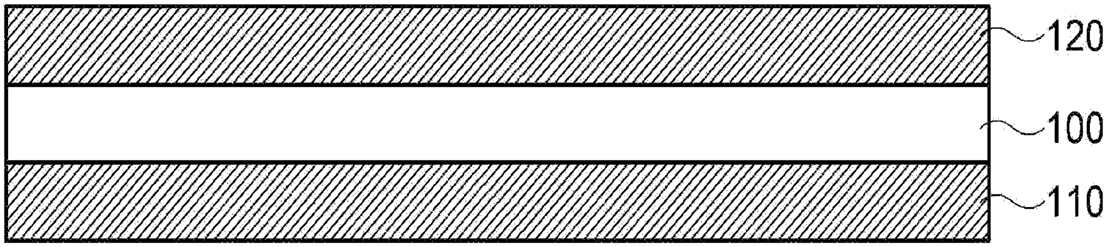
FIGS. 1 and 2 are schematic top planar and cross-sectional views, respectively, illustrating an antenna device in accordance with exemplary embodiments.
Figure 2:
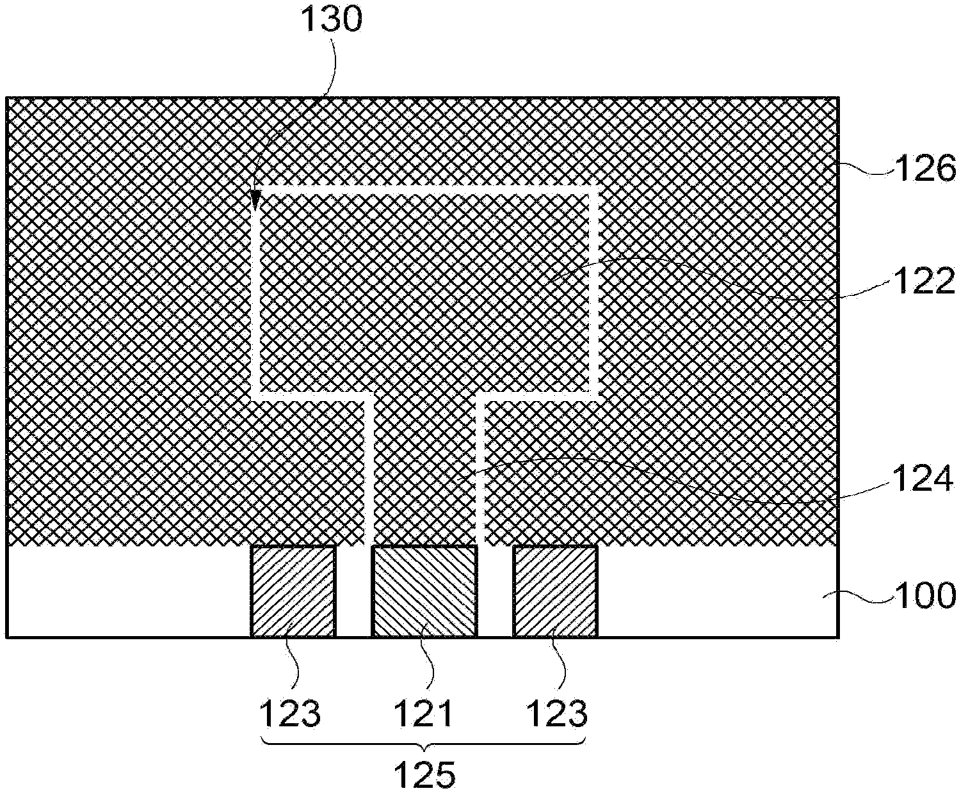

FIGS. 1 and 2 are schematic top planar and cross-sectional views, respectively, illustrating an antenna device in accordance with exemplary embodiments.

Referring to FIGS. 1 and 2, the antenna device according to exemplary embodiments may include a dielectric layer 100, a first electrode layer 120 disposed on an upper surface of the dielectric layer 100 and a second electrode layer 110 disposed on a lower surface of the dielectric layer 100.

The dielectric layer 100 may include an insulating material having a predetermined dielectric constant. The dielectric layer 100 may include, e.g., an inorganic insulation material such as glass, silicon oxide, silicon nitride, a metal oxide, etc., or an organic insulation material such as an epoxy resin, an acrylic resin, an imide-based resin, etc. The dielectric layer 100 may serve as a film substrate of the antenna device on which the first electrode layer 110 may be formed.

For example, a transparent film may be used as the dielectric layer 100. The transparent film may include, e.g., a polyester-based resin such as polyethylene terephthalate, polyethylene isophthalate, polyethylene naphthalate, polybutylene terephthalate, etc.; a cellulose-based resin such as diacetyl cellulose, triacetyl cellulose, etc.; a polycarbonate-based resin; an acrylic resin such as polymethyl (meth) acrylate, polyethyl (meth)acrylate, etc.; a styrene-based resin such as polystyrene, an acrylonitrile-styrene copolymer, etc.; a polyolefin-based resin such as polyethylene, polypropylene, a cyclo-based or norbornene-structured polyolefin, an ethylene-propylene copolymer, etc.; a vinyl chloride-based resin; an amide-based resin such as nylon, an aromatic polyamide, etc.; an imide-based resin; a polyether sulfone-based resin; a sulfone-based resin; a polyether ether ketone-based resin; a polyphenylene sulfide-based resin; a vinyl alcohol-based resin; a vinylidene chloride-based resin; a vinyl butyral-based resin; an allylate-based resin; a polyoxymethylene-based resin; an epoxy-based resin; a urethane or acryl urethane-based resin; a silicone-based resin, etc. These may be used alone or a combination thereof.

In some embodiments, an adhesive film including, e.g., as an optically clear adhesive (OCA), an optically clear resin (OCR), or the like may be included in the dielectric layer 100.

In some embodiments, a dielectric constant of the dielectric layer 100 may be adjusted in a range from about 1.5 to about 12. If the dielectric constant exceeds about 12, a driving frequency may be excessively reduced and an antenna driving in a desired high frequency band may not be obtained.

As illustrated in FIG. 2, the first electrode layer 120 may include an antenna unit including a radiator 122 and a transmission line 124. The antenna unit or the first electrode layer 120 may further include a pad electrode 125 connected to an end of the transmission line 124.

In exemplary embodiments, the first electrode layer 120 may further include a dummy electrode 126 arranged around the antenna unit.

The first electrode layer 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca) or an alloy thereof. These may be used alone or in combination thereof.

In an embodiment, the first electrode layer 120 may include silver or a silver alloy to have a low resistance. For example, first electrode layer 120 may include a silver-palladium-copper (APC) alloy.

In an embodiment, the first electrode layer 120 may include copper (Cu) or a copper alloy in consideration of low resistance and pattern formation with a fine line width. For example, the first electrode layer 120 may include a copper-calcium (Cu-Ca) alloy.

In some embodiments, the first electrode layer 120 may include a transparent metal oxide such as indium tin oxide (ITO), indium zinc oxide (IZO), indium zinc oxide (ITZO), zinc oxide (ZnOx), etc.

For example, the first electrode layer 120 may have a multi-layered structure including a metal or alloy layer and a transparent metal oxide layer.

In some embodiments, the first electrode layer 120 may include a lamination structure of a transparent conductive oxide layer and metal layer, for example, may have a two-layered structure of transparent conductive oxide layer-metal layer or a three-layered structure of transparent conductive oxide layer-metal layer-transparent conductive oxide layer. In this case, resistance may be reduced to improve signal transmission speed while improving flexible properties by the metal layer, and corrosion resistance and transparency may be improved by the transparent conductive oxide layer.

In exemplary embodiments, the radiator 122 of the antenna unit or the first electrode layer 120 may include a mesh structure (a first mesh structure). Accordingly, transmittance of the radiator 122 may be increased, and flexibility of the antenna device may be enhanced. Thus, the antenna device may be effectively applied to a flexible display device.

The dummy electrode 126 may also include a mesh structure (a second mesh structure), and a mesh structure having a shape substantially the same as that included in the radiator 122 (the first mesh structure) may be included in the dummy electrode 126. In some embodiments, the dummy electrode 126 and the radiator 122 may include the same metal.

In some embodiments, the second mesh structure of the dummy electrode 126 may have different shapes including, e.g., a line width, a unit cell shape, etc., from those of the first mesh structure of the radiator 122.

The transmission line 124 may extend from one end of the radiator 122 and may be electrically connected to the pad electrode 125. For example, the transmission line 124 may protrude from a central portion of the radiator 122.

In an embodiment, the transmission line 124 may include a conductive material that may be substantially the same as that of the radiator 122 and may be formed by substantially the same etching process. In this case, the transmission line 124 may be integrally connected with the radiator 122 and may be provided as a substantially single or unitary member.

In some embodiments, the transmission line 124 and the radiator 122 may include substantially the same mesh structure (the first mesh structure).

The pad electrode 125 may include a signal pad 121 and a ground pad 123. The signal pad 121 may be electrically connected to the radiator 122 via the transmission line 124, and may electrically connect a driving circuit unit (e.g., an IC chip) and the radiator 122 with each other.

For example, a circuit board such as a flexible circuit board (FPCB) may be electrically connected to the signal pad 121 via a conductive intermediate structure such as an anisotropic conductive film (ACF), and the driving circuit unit may be disposed on the flexible circuit board. Accordingly, signal transmission/reception may be implemented between the antenna unit and the driving circuit unit. For example, the driving circuit unit may be directly mounted on the flexible circuit board.

In some embodiments, a pair of the ground pads 123 may face each other with respect to the signal pad 121 while being electrically and physically separated from the signal pad 121. Accordingly, a horizontal radiation may be also implemented together with a vertical radiation by the antenna device.

The pad electrode 125 may have a solid structure including the metal or alloy as described above to reduce signal resistance.

As described above, the dummy electrode 126 may include the mesh structure, and may be electrically or physically separated or spaced from the antenna unit and the pad electrode 125.

For example, a separation region 130 may be formed along a side line or a profile of the antenna unit to separate the dummy electrode 126 and the antenna unit from each other.

As described above, the antenna unit may be formed to include the mesh structure so that the transmittance of the antenna device may be improved. In an embodiment, electrode lines included in the mesh structure may be formed of a low resistance metal such as copper, silver, an APC alloy or a CuCa alloy to suppress a resistance increase. Therefore, a transparent film antenna having low resistance and high sensitivity may be provided.

Further, the dummy electrode 126 having the same mesh structure may be arranged around the antenna unit so that the antenna unit may be prevented from being seen by the user of the display device due to a local deviation of electrode arrangements.

The second electrode layer 110 may serve as a ground electrode of the antenna unit. In this case, a contact or a connecting ground pattern may be formed in the dielectric layer 100 to connect the second electrode layer 110 and the ground pad 123.

For example, capacitance or inductance may be formed between the radiator 122 and the second electrode layer 110 by the dielectric layer 100 in a thickness direction of the antenna device, so that a driving or sensing frequency band of the antenna device may be adjusted. For example, the antenna device may be provided as a vertical radiation antenna by the second electrode layer 110.

In some embodiments, the second electrode layer 110 may be included as an individual element of the antenna device. In some embodiments, a conductive member of a display device in which the antenna element is inserted may serve as a ground layer.

The conductive member may include, e.g., a gate electrode of a thin film transistor (TFT) included in a display panel, various wiring such as a scan line or a data line, various electrodes such as a pixel electrode and a common electrode.

The second electrode layer 110 may include a conductive material such as the metal, the alloy, and the transparent metal oxide described above.

Figure 3:
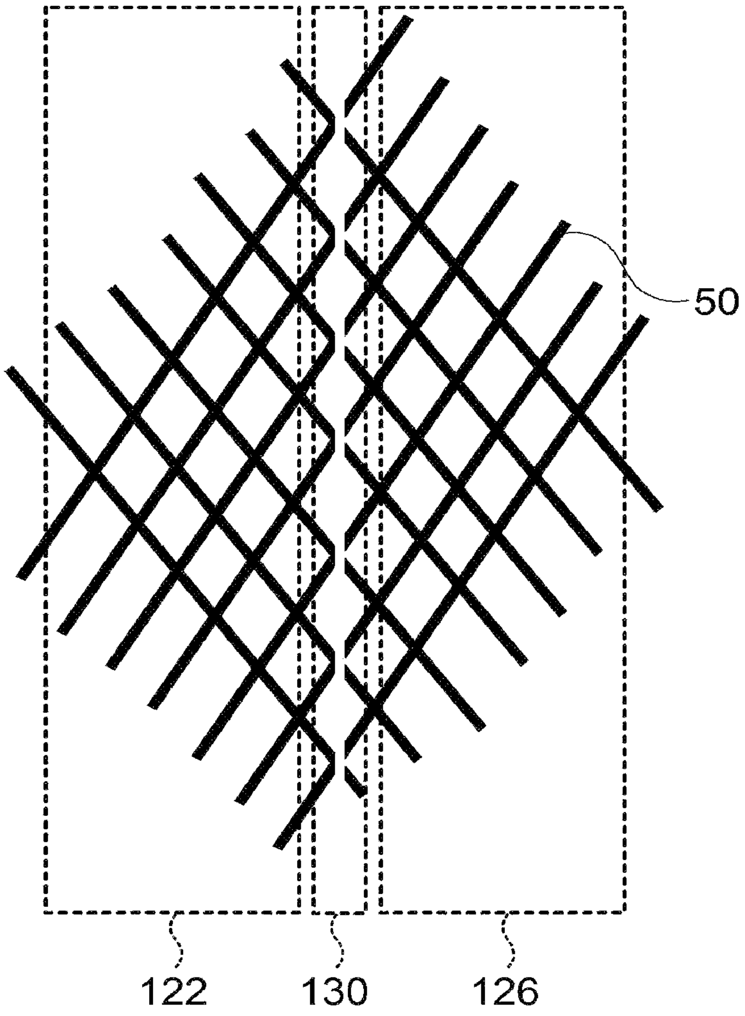
FIG. 3 is a partially enlarged view illustrating an electrode line structure of an antenna element according to example embodiments.

FIG. 3 is a partially enlarged view illustrating an electrode line structure of an antenna element according to example embodiments.

Referring to FIG. 3, a plurality of electrode lines 50 may be arranged to cross each other, and thus a mesh structure may be formed. The mesh structure may be divided by the separation region 130 to define the antenna patten including the radiator 122 and the dummy pattern 126.

For example, the separation region 130 may continuously extend along intersecting portions of the electrode lines 50 in a length direction or a width direction of FIG. 3. The dummy pattern 126 and the radiator 122 may be electrically and physically separated from each other by the separation region 130 so that the antenna unit may be defined without an additional boundary pattern. Thus, an electrode recognition that may be caused by the boundary pattern may be prevented.

Figure 4:
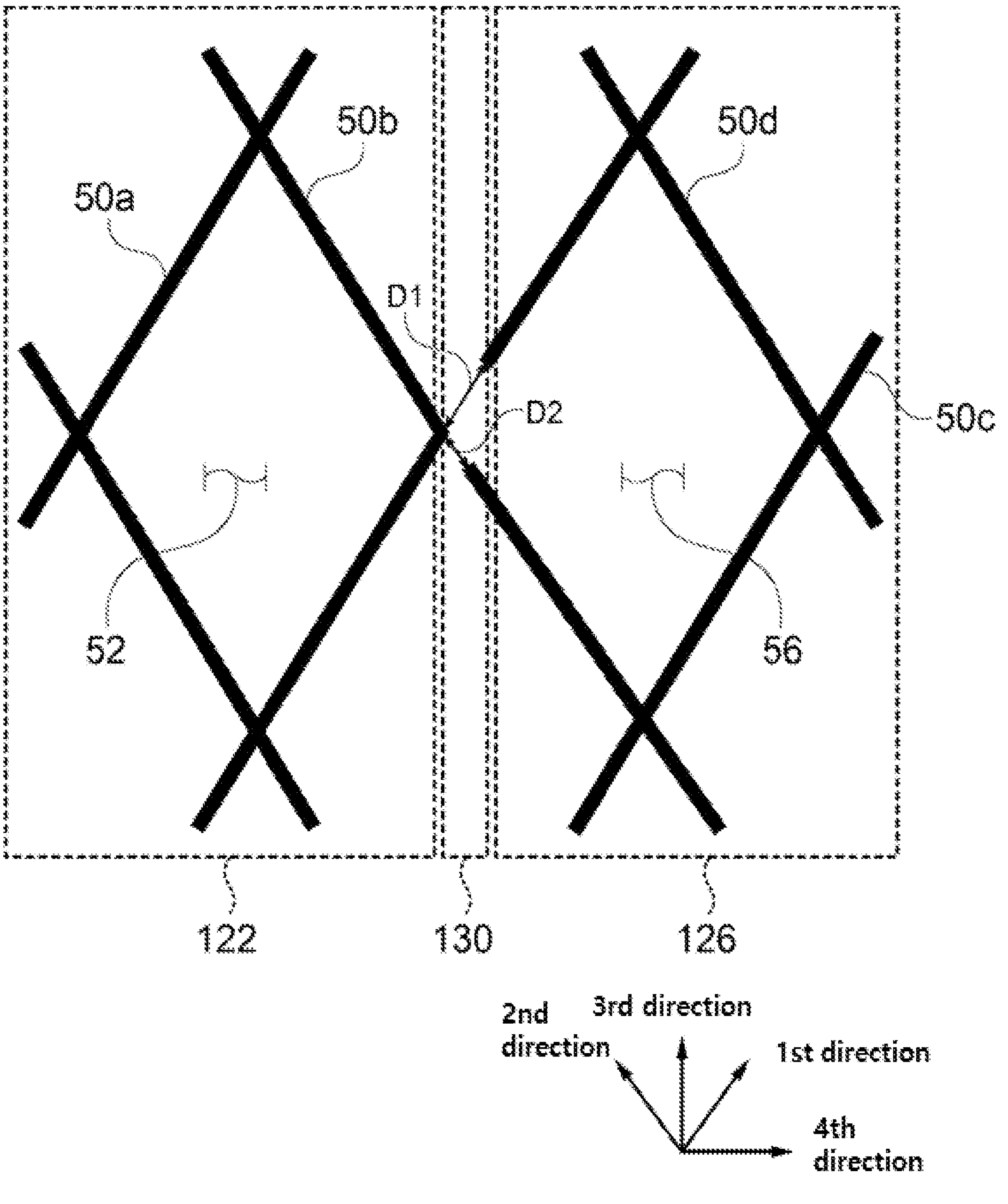
FIG. 4 is a partially enlarged view illustrating a separation region of an antenna device in accordance with exemplary embodiments.

FIG. 4 is a partially enlarged view illustrating a separation region of an antenna device in accordance with exemplary embodiments.

In FIG. 4, a length direction and a width direction of the antenna unit included in the antenna device are defined as a third direction and a fourth direction, respectively. A first direction and a second direction may be inclined by a predetermined acute angle with respect to the third direction.

Referring to FIG. 4, as described with reference to FIG. 3, the radiator 122 and the dummy electrode 126 may be distinguished by the separation region 130.

The radiator 122 may include a first mesh structure defined by a plurality of first antenna electrode lines 50*a* extending in the first direction and a plurality of second antenna electrode lines 50*b* extending in the second direction which cross each other.

The first mesh structure may include an antenna unit cell 52 defined by a pair of neighboring first antenna electrode lines 50*a* and a pair of neighboring second antenna electrode lines 50*b* intersecting each other. In exemplary embodiments, the antenna unit cell 52 may have a substantially rhombus shape.

The dummy electrode 126 may include a second mesh structure defined by a plurality of first dummy electrode lines 50*c* extending in the first direction and a plurality of second dummy electrode lines 50*d* extending in the second direction which cross each other.

The second mesh structure may include a dummy unit cell 56 defined by a pair of neighboring first dummy electrode lines 50*c* and a pair of neighboring second dummy electrode lines 50*d* intersecting each other. In exemplary embodiments, the dummy unit cell 56 may have a substantially rhombus shape.

In some embodiments, the first mesh structure and the second mesh structure may have substantially the same shape. In this case, the antenna unit cell 52 and the dummy unit cell 56 may have substantially the same area. Additionally, the electrode lines 50*a*, 50*b*, 50*c*, and 50*d* may have substantially the same line width and thickness.

The dummy unit cell 56 adjacent to the separation region 130 may have a shape in which a vertex portion is cut within the separation region 130. Accordingly, the dummy unit cell 56 may be electrically and physically separated from the antenna unit cell 52 adjacent to the separation region 130.

In exemplary embodiments, spacing distances between the dummy electrode lines 50*c* and 50*d* included in the dummy electrode 126 and the antenna unit cell 52 in the separation region 130 may be different from each other. In some embodiments, the spacing distance may refer to a distance from a vertex portion of the adjacent antenna unit cell 52 adjacent to the separation region 130.

The spacing distance may include a spacing distance in the first direction between the first antenna electrode line 50*a* and the first dummy electrode line 50*c* within the separation region 130 (hereinafter, referred to a first spacing distance D1) or a spacing distance in the second direction between the second antenna electrode line 50*b* and the second dummy electrode line 50*d* within the separation region 130 (hereinafter, referred to a second spacing distance D2).

In exemplary embodiments, the first spacing distance D1 and the second spacing distance D2 may be different. For example, the first spacing distance D1 may be greater than the second spacing distance D2.

The first spacing distance D1 and the second spacing distance D2 may be formed to be different from each other so that regular repetition of contrast change may be reduced or mitigated to prevent electrodes from being visually recognized at the separation region 130.

In some embodiments, the first spacing distance D1 may be about 1.5 to 5 times the second spacing distance D2, preferably about 1.5 to 3 times the second spacing distance D2. Within the above range, an electrode visibility due to an excessive increase of a difference between the spacing distances may be prevented while suppressing a contrast increase.

In some embodiments, the second spacing distance D2 may be from about 3 μm to about 10 μm. Within the above range, radiation interference, current absorption, impedance disturbance, etc., by the dummy electrode 126 may be prevented, and the electrode visibility due to a visual separation of the dummy electrode 126 and the radiating electrode 122 may be effectively prevented.

In a preferable embodiment, the second spacing distance D2 may be from about 3 μm to about 8 μm.

In some embodiments, arrangements of the first spacing distance D1 and the second spacing distance D2 may be regularly or randomly constructed. For example, the first spacing distance D1 and the second spacing distance D2 included in each of the dummy unit cells 56 that overlap the separation region 130 may be different In an embodiment, positions of the first spacing distance D1 and the second spacing distance D2 included in each of the dummy unit cells 56 may be different. For example, positions of the first spacing distance D1 and the second spacing distance D2 included in each of the dummy unit cells 56 may be alternately changed along the third direction.

Figure 5:
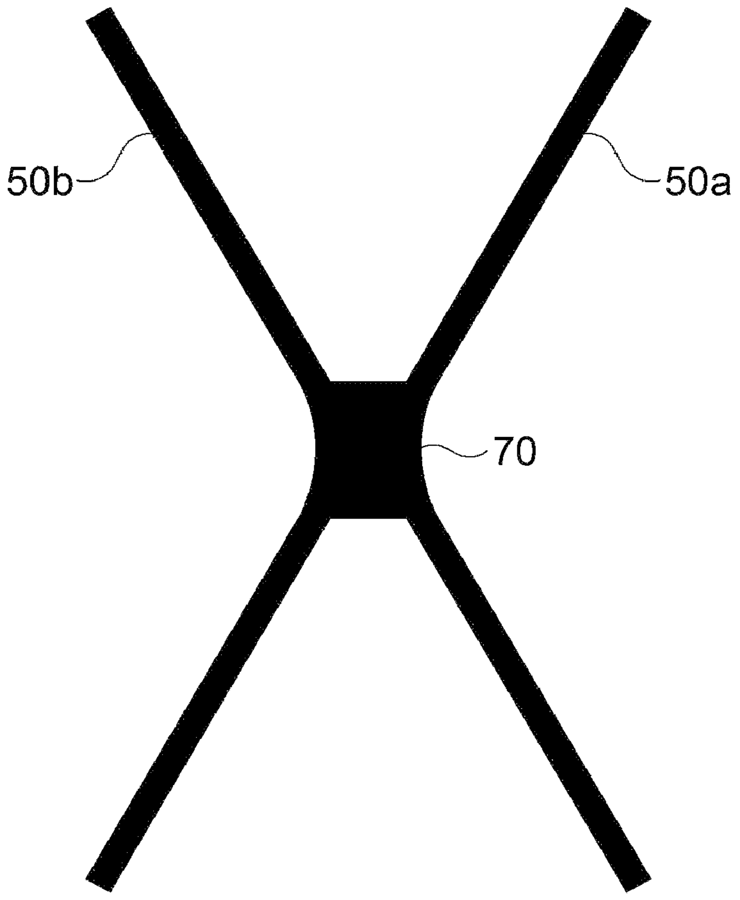
FIG. 5 is a partially enlarged view illustrating a structure of a radiator of an antenna device in accordance with exemplary embodiments.

FIG. 5 is a partially enlarged view illustrating a structure of a radiator of an antenna device in accordance with exemplary embodiments.

Referring to FIG. 5, as described with reference to FIG. 4, the radiator 122 may include a first mesh structure in which the first and second antenna electrode lines 50*a* and 50*b* cross each other.

The first mesh structure may include an intersecting portion 70 where the first and second antenna electrode lines 50*a* and 50*b* may cross each other. In some embodiments, a lateral surface of the intersecting portion 70 may have a concave curved shape. Thus, the electrode recognition due to a sudden change of a cross angle of the electrode lines at the intersecting region may be prevented.

In some embodiments, an intersecting portion of the dummy electrode lines 50*c* and 50*d* included in the dummy electrode 126 may also include a concave lateral surface.

Figure 6:
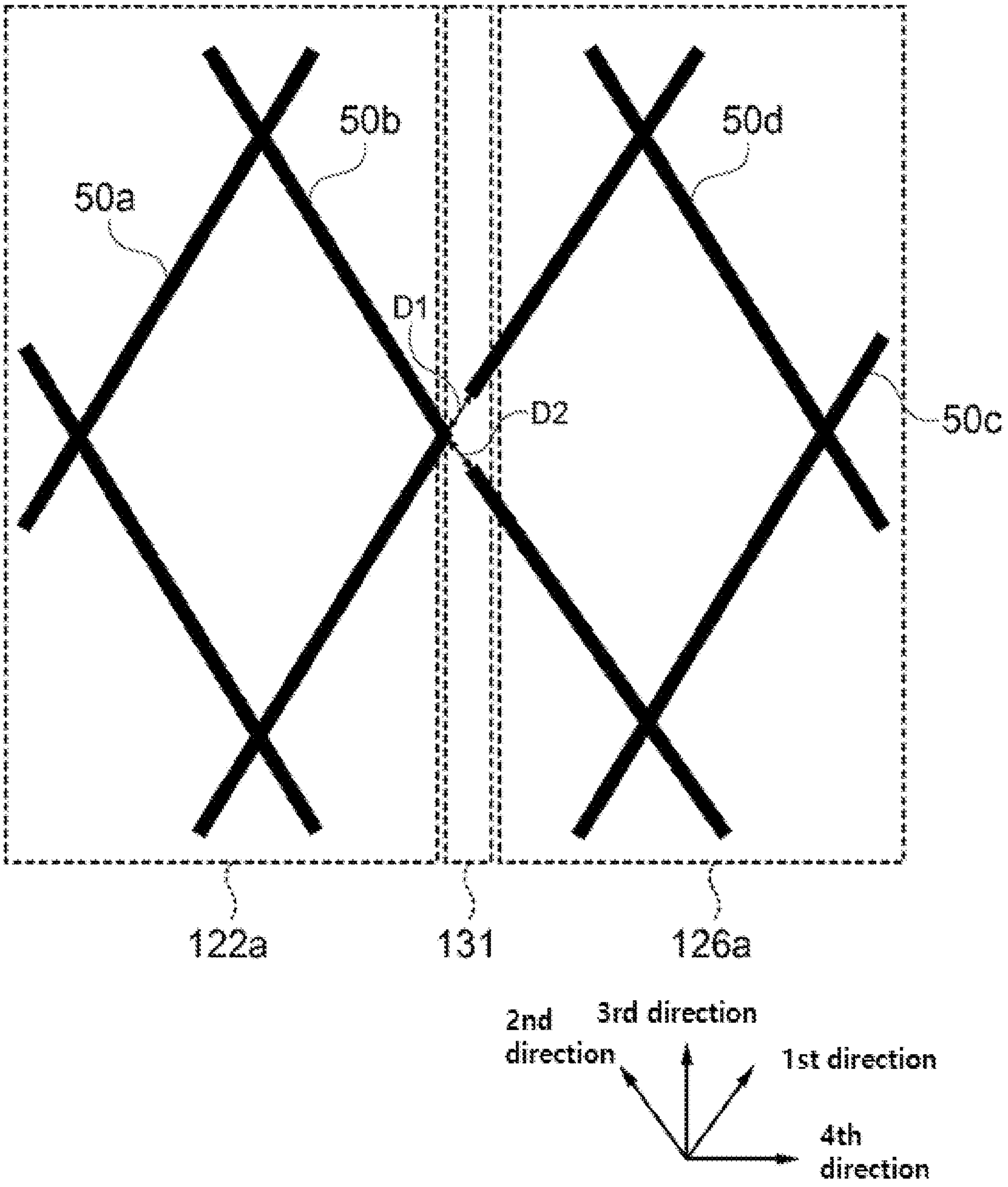
FIGS. 6 and 7 are schematic views for describing a separation region of an antenna device according to comparative examples.
Figure 7:
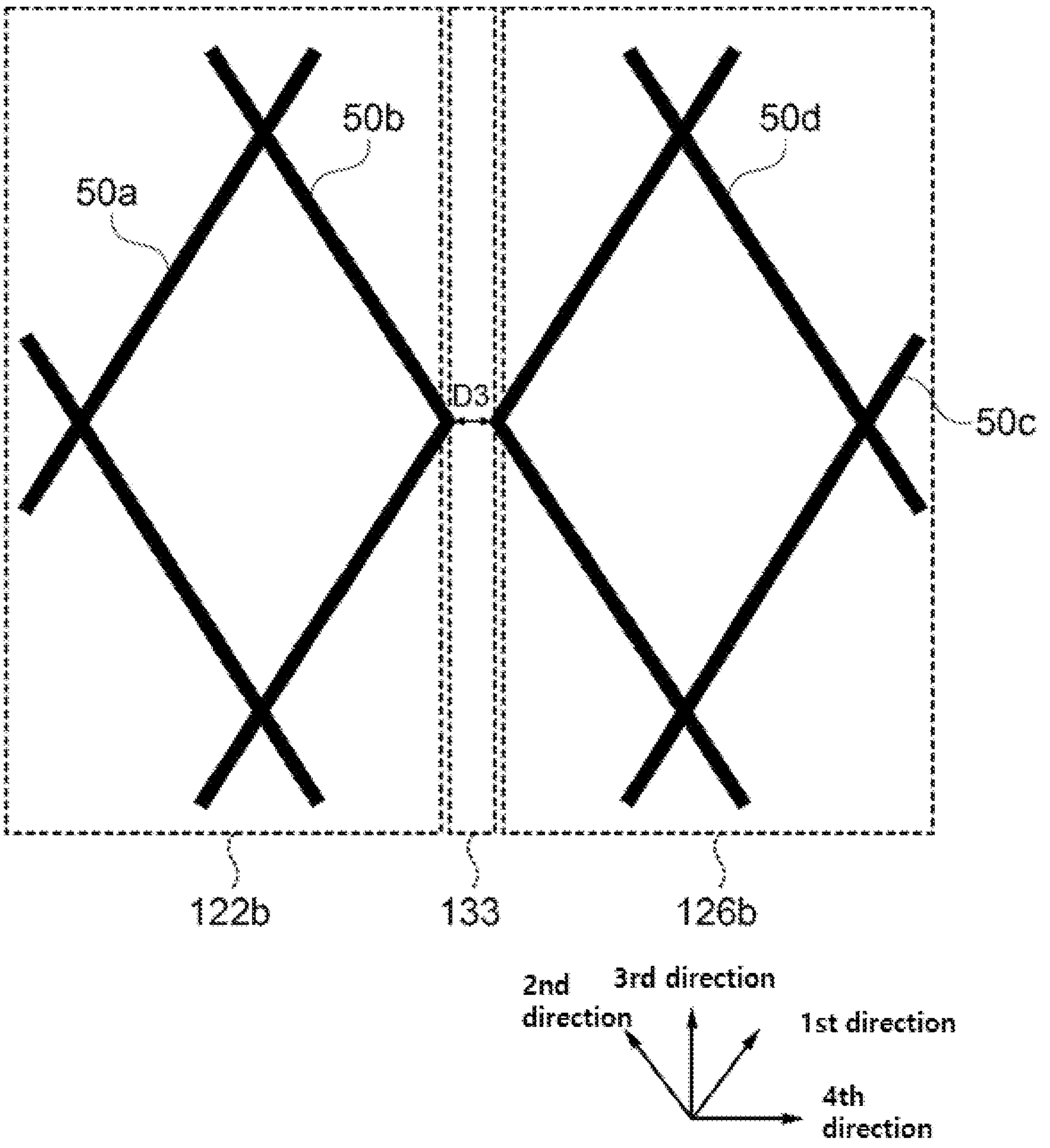

FIGS. 6 and 7 are schematic views for describing a separation region of an antenna device according to comparative examples.

Referring to FIG. 6, a radiator 122*a* and a dummy electrode 126*a* are separated from each other by a separation region 131, and a first spacing distance D1 and a second spacing distance D2 may be the same.

Referring to FIG. 7, a radiator 122*b* and a dummy electrode 126*b* are separated from each other by a separation region 133, and each unit cell included in the radiator 122*b* and the dummy electrode 126*b* adjacent to the separation region 133 may have a rhombus shape without a cut portion.

In this case, a spacing distance D3 between the radiator 122*b* and the dummy electrode 126*b* may be defined as a distance between vertices of an antenna unit cell and a dummy unit cell neighboring each other.

According to the comparative examples as illustrated in FIGS. 6 and 7, a regularity in an arrangement of an electrode region and a non-electrode region along the separation regions 131 and 133 may be increased. Accordingly, a contrast difference may be also increased to generate the electrode visibility to a user.

However, according to exemplary embodiments as described with reference to FIG. 3, the vertex portion of the dummy unit cell 56 in the separation region 130 may be cut to generate different spacing distances so that an irregularity in an arrangement of an electrode region and a non-electrode region may be induced. Therefore, the electrode visibility due to the contrast difference may be alleviated or prevented.

Further, according to exemplary embodiment, the vertex portion of the dummy unit cell 56 may be cut, and the antenna unit cell 52 may maintain a closed rhombus shape. Accordingly, radiation interference and current absorption by the dummy electrode 126 may be suppressed while promoting current flow in the radiator 122.

Figure 8:
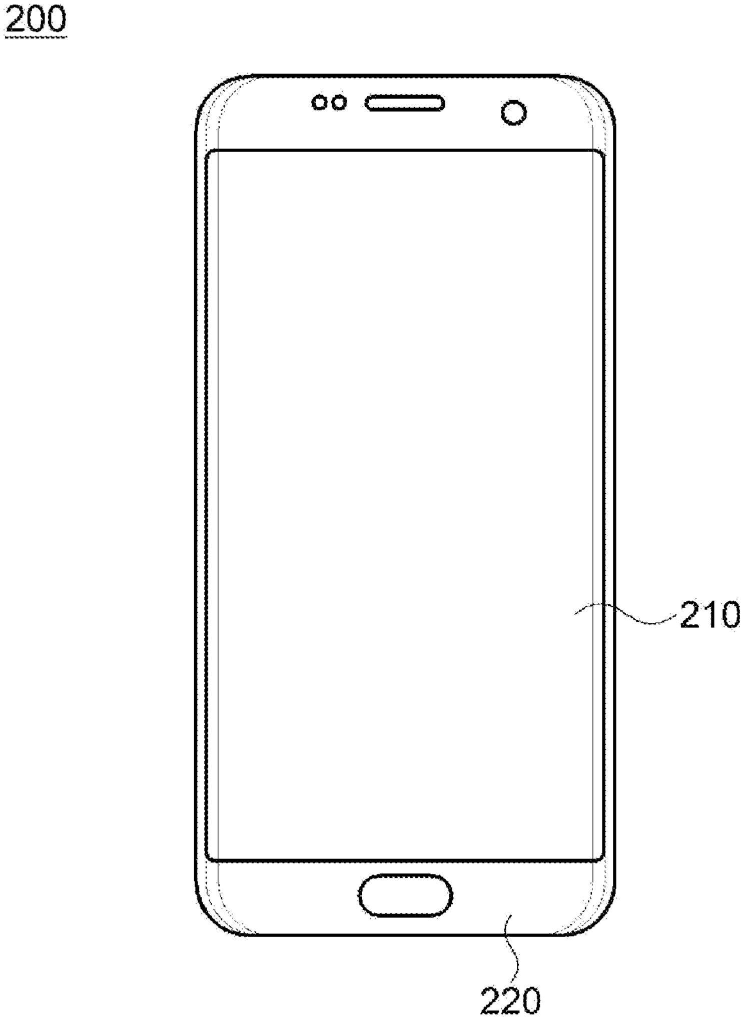
FIG. 8 is a schematic top planar view illustrating a display device in accordance with exemplary embodiments.

FIG. 8 is a schematic top planar view illustrating a display device in accordance with exemplary embodiments.

For example, FIG. 8 illustrates an outer shape including a window of a display device.

Referring to FIG. 8, a display device 200 may include a display region 210 and a peripheral region 220. The peripheral region 220 may be positioned, e.g., at both lateral portions and/or both end portions.

In some embodiments, the above-described antenna device may be inserted in the display device 200 as a patch or film shape. In some embodiments, the antenna unit of the antenna device may be entirely covered by the display region 210 of the display device 200. In some embodiments, the radiator 122 of the above-described antenna device may be disposed to at least partially correspond to the display region 210 of the display device 200, and the pad electrode 125 may be disposed to correspond to the peripheral region 220 of the display device 200.

The peripheral region 220 may correspond to, e.g., a light-shielding portion or a bezel portion of the display device 200. Additionally, a driving circuit such as an IC chip of the display device 200 and/or the antenna device may be disposed in the peripheral region 220.

The pad electrode 125 of the antenna device may be disposed to be adjacent to the driving circuit so that a length of a signaling path may be decreased to suppress a signal loss.

The antenna device may include the antenna unit and the dummy electrode that may have the mesh structure as described above so that transmittance may be improved while suppressing or reducing the electrode recognition. Thus, image quality in the display region 210 may be also enhanced while improving or maintaining desired communication reliability.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Experimental Example: Evaluation of Electrode Visibility

Example

According to the construction as illustrated in FIG. 4, an antenna unit including a radiator and a dummy electrode were formed of a mesh structure. Specifically, an electrode layer of the mesh structure was formed on an upper surface of a glass dielectric layer (0.7 T) using an alloy (APC) of silver (Ag), palladium (Pd) and copper (Cu), and a ground layer was formed on a lower surface of the dielectric layer by depositing APC. A line width of an electrode line in the mesh structure was 3 μm and an electrode thickness (or a height) was 2000 Å. A length of an X-direction diagonal line was 200 pm and a length of a Y-direction diagonal line was 400 μm in a rhombus unit cell included in the mesh structure.

In FIG. 4, the first spacing distance D1 was maintained as twice the second spacing distance D2, and an electrode visibility was evaluated while changing the second spacing distance D2.

Specifically, the antenna device was observed by 30 panels, and the pattern recognition ratio (PTN recognition ratio (%)) was evaluated as between 0 to 100%. The evaluated values from 30 panels were averaged.

Comparative Example 1

As illustrated in FIG. 6, the first spacing distance (D1) and the second spacing distance (D2) were formed to be the same as each other, and the electrode visibility was evaluated by the same manner as that of Example.

Comparative Example 2

As illustrated in FIG. 7, the separation region was formed not to cut the dummy unit cell, and the electrode visibility was evaluated by the same manner as that of Example.

Figure 9:
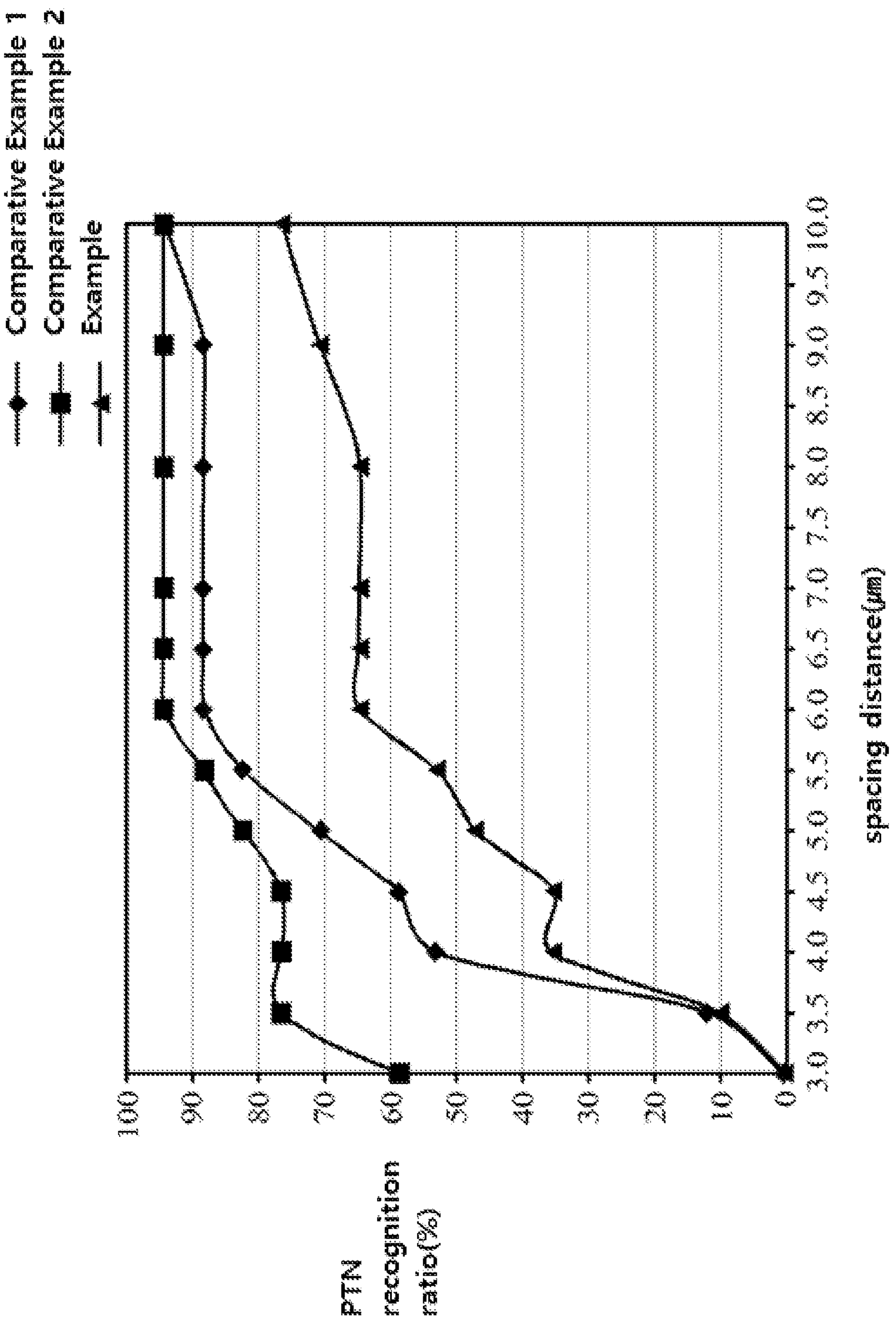
FIG. 9 is a graph showing results of evaluation of an electrode visibility according to Experimental Example.

FIG. 9 is a graph showing results of evaluation of an electrode visibility according to Experimental Example.

Referring to FIG. 9, the electrode visibility in Example having different spacing distances was much less than those in Comparative Examples.

What is claimed is:

1. An antenna device, comprising:

a dielectric layer comprising a separation region defined on an upper surface thereof;

a radiator on the upper surface of the dielectric layer, the radiator comprising a first mesh structure, wherein the first mesh structure includes a first antenna electrode line and a second antenna electrode line which cross each other; and a dummy electrode spaced apart from the radiator by the separation region on the upper surface of the dielectric layer, the dummy electrode comprising a second mesh structure, wherein the second mesh structure includes a first dummy electrode line and a second dummy electrode line which cross each other, wherein a spacing distance between the first dummy electrode line and the radiator is different from a spacing distance between the second dummy electrode line and the radiator at the separation region, wherein the first dummy electrode line and the first antenna electrode line extend in the same direction, and a first spacing distance is defined between the first dummy electrode line and the first antenna electrode line adjacent to each other at the separation region, wherein the second dummy electrode line and the second antenna electrode line extend in the same direction, and a second spacing distance is defined between the second dummy electrode line and the second antenna electrode line adjacent to each other at the separation region, wherein the first spacing distance is greater than the second spacing distance.

2. The antenna device according to claim 1, wherein the first spacing distance is 1.5 to 5 times the second spacing distance.

3. The antenna device according to claim 1, wherein the second spacing distance is 3 μm to 10 μm.

4. The antenna device according to claim 1, wherein the first mesh structure includes a rhombus-shaped antenna unit cell, and the second mesh structure includes a rhombus-shaped dummy unit cell.

5. The antenna device according to claim 1, wherein an intersecting portion of the first antenna electrode line and the second antenna electrode line has a concave lateral surface.

6. The antenna device according to claim 1, further comprising a ground layer on a lower surface of the dielectric layer.

7. The antenna device according to claim 1, further comprising:

a transmission line electrically connected to the radiator; and a signal pad electrically connected to an end of the transmission line.

8. The antenna device according to claim 7, wherein the transmission line includes the first mesh structure.

9. The antenna device according to claim 1, further comprising a ground pad on the upper surface of the dielectric layer around the signal pad to be separated from the signal pad.

10. The antenna device according to claim 9, wherein signal pad or the ground pad has a solid structure.

11. A display device comprising the antenna device according to claim 1.

12. An antenna device, comprising:

a dielectric layer including a separation region defined on an upper surface thereof;

a radiator on the upper surface of the dielectric layer, the radiator including a first mesh structure, wherein the first mesh structure includes a first antenna electrode line and a second antenna electrode line which cross each other; and a dummy electrode spaced apart from the radiator by the separation region on the upper surface of the dielectric layer, the dummy electrode including a second mesh structure, wherein the second mesh structure includes a first dummy electrode line and a second dummy electrode line which cross each other, wherein a spacing distance between the first dummy electrode line and the radiator is different from a spacing distance between the second dummy electrode line and the radiator at the separation region, wherein the first dummy electrode line and the first antenna electrode line extend in the same direction, and a first spacing distance is defined between the first dummy electrode line and the first antenna electrode line adjacent to each other at the separation region, wherein the second dummy electrode line and the second antenna electrode line extend in the same direction, and a second spacing distance is defined between the second dummy electrode line and the second antenna electrode line adjacent to each other at the separation region, wherein the first mesh structure includes a rhombus-shaped antenna unit cell, and the second mesh structure includes a rhombus-shaped dummy unit cell, wherein the first spacing distance is defined as a distance between the first dummy electrode line and a vertex portion of the antenna unit cell at the separation region, and the second spacing distance is defined as a distance between the second dummy electrode line and the vertex portion of the antenna unit cell at the separation region.

13. The antenna device according to claim 12, wherein a vertex portion of the dummy unit cell positioned at the separation region has a cut shape.

* * * * *